(12) United States Patent
May et al.

(10) Patent No.: US 6,206,406 B1
(45) Date of Patent: Mar. 27, 2001

(54) MULTI-PURPOSE DISPENSING APPARATUS (76) Inventors: Brad May, Rte. 2 Box 203; Don May, Jr., Rte. 2 Box 156C; Fount May, Jr., Rte. 2 Box 189C, all of Quincy, FL (US) 32351; Fred B. May, 681 Forest Lair, Tallahassee, all of FL (US) 32312; John Lawson Taylor, II, 4962 Fowlstown Rd., Attapulgus, GA (US) 31715

( * ) Notice: Subject to any disclaimer, the term of this patent is extended or adjusted under 35 U.S.C. 154(b) by 0 days.

(21) Appl. No.: 09/122,738

(22) Filed: Jul. 27, 1998

(51) Int. Cl.[7] ........................................... B62B 1/00
(52) U.S. Cl. ..................... 280/656; 239/163; 239/166; 239/167; 239/169; 239/172; 239/77
(58) Field of Search ............... 280/656; 239/77, 239/166, 172, 163, 167, 169

(56) References Cited

U.S. PATENT DOCUMENTS

| | | | |
|---|---|---|---|
| 2,964,247 | * 12/1960 | Maasdam | 280/656 |
| 3,818,320 | * 6/1974 | Skurray | 239/127 |
| 4,008,833 | 2/1977 | Gandrud et al. | 222/178 |
| 4,172,537 | * 10/1979 | Gandrud et al. | 280/656 X |
| 4,301,873 | * 11/1981 | Baxter | 280/656 X |
| 4,364,581 | * 12/1982 | Shoup | 280/656 X |
| 4,394,968 | * 7/1983 | Tyler | 239/172 |
| 4,427,154 | * 1/1984 | Mercil | 239/166 |
| 4,441,655 | * 4/1984 | Blumhardt | 239/166 X |
| 4,565,321 | * 1/1986 | Vestergaard | 239/172 X |
| 4,595,140 | * 6/1986 | Harden et al. | 239/166 |
| 4,944,355 | * 7/1990 | Karchewski | 280/656 |
| 5,029,757 | * 7/1991 | Bourgault | 239/166 X |
| 5,154,240 | * 10/1992 | Carrick | 280/656 X |
| 5,176,322 | * 1/1993 | Sartor | 239/77 |
| 5,927,606 | * 7/1999 | Patterson | 239/166 |

* cited by examiner

*Primary Examiner*—Lanna Mai
*Assistant Examiner*—Toan To
(74) *Attorney, Agent, or Firm*—Carnes Cona Dixon (57) ABSTRACT

The present invention is an apparatus that will adequately and efficiently dispense a substance, such as fertilizer, repellent, which is removably secured to a conventional tractor to allow for adequate traveling thereof. The present invention includes a frame member and a trailer. The frame member includes a first portion or first boom and a second portion or second boom that are pivotally mounted to the trailer via a pivoting mechanism. Each portion or boom operates is designed and configured to operate independently and travels transversely from the conventional tractor to enable utilization and includes a truss configuration. These booms can be raised or lowered by way of a height adjusting mechanism. In addition, the portions or booms can also be relocated centrally and rearwardly with respect to the tractor for rendering a more compact unit which will provide an easy method for transporting the apparatus from field to field, from field to barn, barn to field, or the like.

19 Claims, 5 Drawing Sheets

MULTI-PURPOSE DISPENSING APPARATUS

BACKGROUND OF THE INVENTION

1. Field of the Invention

The present invention relates generally to a dispensing apparatus and more particularly to a dispensing apparatus designed and configured to dispense and swath any substance, such as fertilizer, repellent, or the like, over a multiplicity of plants simultaneously for consequently reducing labor, costs and time generally associated with the dispensing process for treating a bulk of plants, crops or the like, typically located on farms, in nurseries, or the like.

2. Description of the Prior Art

Fertilizing is of the utmost importance in maintaining and growing healthy and hearty plants for inherently producing an aesthetically pleasing and a beautiful and plentiful fruit/flowering product. Fertilizers provide the needed nutrients required for a healthy plant. Several products are out on the market to enable a proper supply of nutrients to any given plants, lawn grass, crops, or the like. Many of these products consist of a chemical solution, which can be placed on the soil surrounding the plant, or optionally can be mixed with water to produce a solution. In either method, an even distribution is difficult to obtain and its fumes may be hazardous to the distributor. In addition, the plant may receive too much fertilizer, inadvertently harming the plant, or too little fertilizer, which will hinder the plant from thriving as well as not promote an effective growth. Additionally, the use of such methods can be laborious, hazardous, and at times can even be difficult and awkward to perform in order to obtain the optimum use of substance for the growing product, especially when applying over a large area, such as a field, nursery or the like.

As such, apparatus have been developed to enable a plurality of plants to be sprayed, simultaneously. One such apparatus is disclosed in U.S. Pat. No. 4,008,833 issued to Gandrud et al. In this patent, there is disclosed a complicated dispensing device which, includes several components for its frame member. This patent may provide a means of dispensing a chemical, but it fails to disclose a device simple in design and easy to utilize. A complicated device, such as the one disclosed in this patent, will provide an apparatus with increase components and which will inherently provide for an increase in component failure.

In U.S. Pat. No. 5,029,757 there is disclosed yet another complex, yet foldable, sprayer. This apparatus comprises two wing booms, a left and right, which are controlled independently from one another via hydraulic cylinders. Thereby allowing the operator to utilize either the left boom, right boom, or optionally, both booms simultaneously. The sprayer mechanism in this apparatus comprises a conduit having a conventional spray head attached thereto. This will permit for fluid to be stored in a central holding tank. Such an arrangement provides an apparatus which appears to be used for dispensing a singular type of fluid. Thereby, prohibiting other types of chemicals to be used with this particular apparatus unless extensive cleaning of the holding tank, conduits and sprayers must be accomplish prior to use of a different type of cleaner. In addition, since conventional hoppers are not used, it may not be difficult for the user to estimate and determine the actual amount of fluid/graduals needed to cover a particular area. Further, the use of left and right booms provides an apparatus that may be difficult and awkward to maneuver.

Hence, what is needed is an apparatus which will adequately and efficiently dispense a substance, such as fertilizer, or the like, utilizing a minimal amount of labor and at a reasonable cost for distribution. Such an apparatus should be of simple construction so as to provide a device which is successful and that can be used with a minimal amount of training.

Accordingly, it is seen that none of these previous efforts provide the benefits intended with the present invention, such as identified above. Additionally, prior techniques do not suggest the present inventive combination of component elements as disclosed and claimed herein. The present invention achieves its intended purposes, objectives and advantages over the prior art device through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The present invention is an apparatus that will adequately and efficiently dispense a substance, such as fertilizer, repellent, or the like, which is adapted to be removably secured to a conventional tractor or the like to allow for adequate traveling thereof. The present invention includes a frame member having a first portion or first boom and a second portion or second boom. Each portion or boom operates independently and travels transversely from the conventional tractor to enable utilization. The portions or booms can also be relocated centrally and rearwardly with respect to the tractor for rendering a more compact unit which will provide an easy means for transporting the apparatus from field to field, from field to barn, barn to field, or the like.

This apparatus is designed and configured to travel transversely from the tractor and over at least two rows of crops for allowing a device which will cover a large surface area. In particular, the device has been successfully employed in a commercial nursery and can successfully spray and swath a multiplicity of plants.

The first and second portions of the frame have a truss boom configuration. Each portion is coupled, via a coupling device, to a trailer. This trailer is removably coupled to the conventional tractor device and as such includes a transportation device, such as wheels, endless tracks or the like.

The coupling device allows for the first and second portions to extend outward or inward from the main frame. In the outward position, the portions are transversely disposed and are in position for disbursing of a substance. In the inward position, the portions are aligned centrally on the main frame. This will provide for the portions to extend behind the main frame and the tractor. It is noted that a separate coupling device is secured to each portion so as to enable each portion to operate independently and separately from one another.

For adequate disbursing of the particular substance, the first portion is designed to be longer in length than the second portion. This will allow for the first portion to service subsequent plants while the second portion will service preceding plants. Thereby, when in a transverse position or the second position, the booms are perpendicularly located with respect to the trailer. In a retracted position, the first portion and second portion will be in a side-by-side position behind the trailer.

When the first frame portion and the second frame portion are located behind the tractor, in the retracted position, transportation can occur, such as from field to field or from field to barn. This placement of the first and second portions provides a means of transportation of the apparatus of the present invention which is achieved with minimal or no difficulties. This retracted position also allows for easy storage of the present invention.

At least one conventional dispensing device, such as a hopper, is secured to each distal end of the first portion and second portion. The dispensing device is conventional and is known in the industry. It is noted that the present invention is not limited to dispensing devices, but can include other conventional farming implement devices, such as, but not limited to, sprayers, toppers, or the like. Such a means of attaching various farming implement devices provides an apparatus that is versatile and applicable to any environment or situation.

The first portion and the second portion further includes a means of adjusting and leveling the farm implements (dispensing devices, sprayers, etc.) to a desired location. Thereby, providing for the farm implements to be tilted and pivoted to the desired height and/or angle.

Counter weights are secured to the main frame to balance the apparatus of the present invention when in an extended and usable position. These weights will prevent the apparatus from tilting or the like, thereby providing for a safe device. Counter weights are also located at the front of the main frame to balance the apparatus when the portions are in a retracted, transportable and storable position.

Accordingly, it is the object of the present invention to provide for a multi-purpose frame apparatus which will overcome the deficiencies, shortcomings, and drawbacks of prior frame devices and methods thereof, used in the farming and nursery industry.

Still another object of the present invention is to provide for a multi-purpose frame apparatus which is easy to use and maneuver as well as provide any type of implement device to be removably secured thereto to consequently offer the user several options and provide a final product with a plurality of utility.

Yet another object of the present invention is to provide for a multi-purpose frame apparatus which will successfully maintain conventional farm implement devices so as to provide for a versatile device which can be used to maintain hoppers for enabling the proper fertilization of plants and which will also enable other implements, such as sprayers, to be removably secured thereto. The use of sprayers not only broadens the utility of the multi-purpose frame by enabling direct central spraying over the desired rows but will inherently prevent waste of chemicals and the like. These precise spraying capabilities will save on chemical usage, the environment and excess costs.

Still a further object of the present invention, to be specifically enumerated herein, is to provide a multi-purpose frame device in accordance with the preceding objects and which will conform to conventional forms of manufacture, be of simple construction and easy to use so as to provide a device that would be economically feasible, long lasting and relatively trouble free in operation.

Although there have been many inventions related to frame devices, none of the inventions have become sufficiently compact, low cost, reliable enough to become commonly used, and enable expansion over a plurality of rows of crops. The present invention meets the requirements of the simplified design, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

Similar reference numerals refer to similar parts throughout the several views of the drawings.

DESCRIPTION OF THE PREFERRED EMBODIMENTS

Figure 1A:
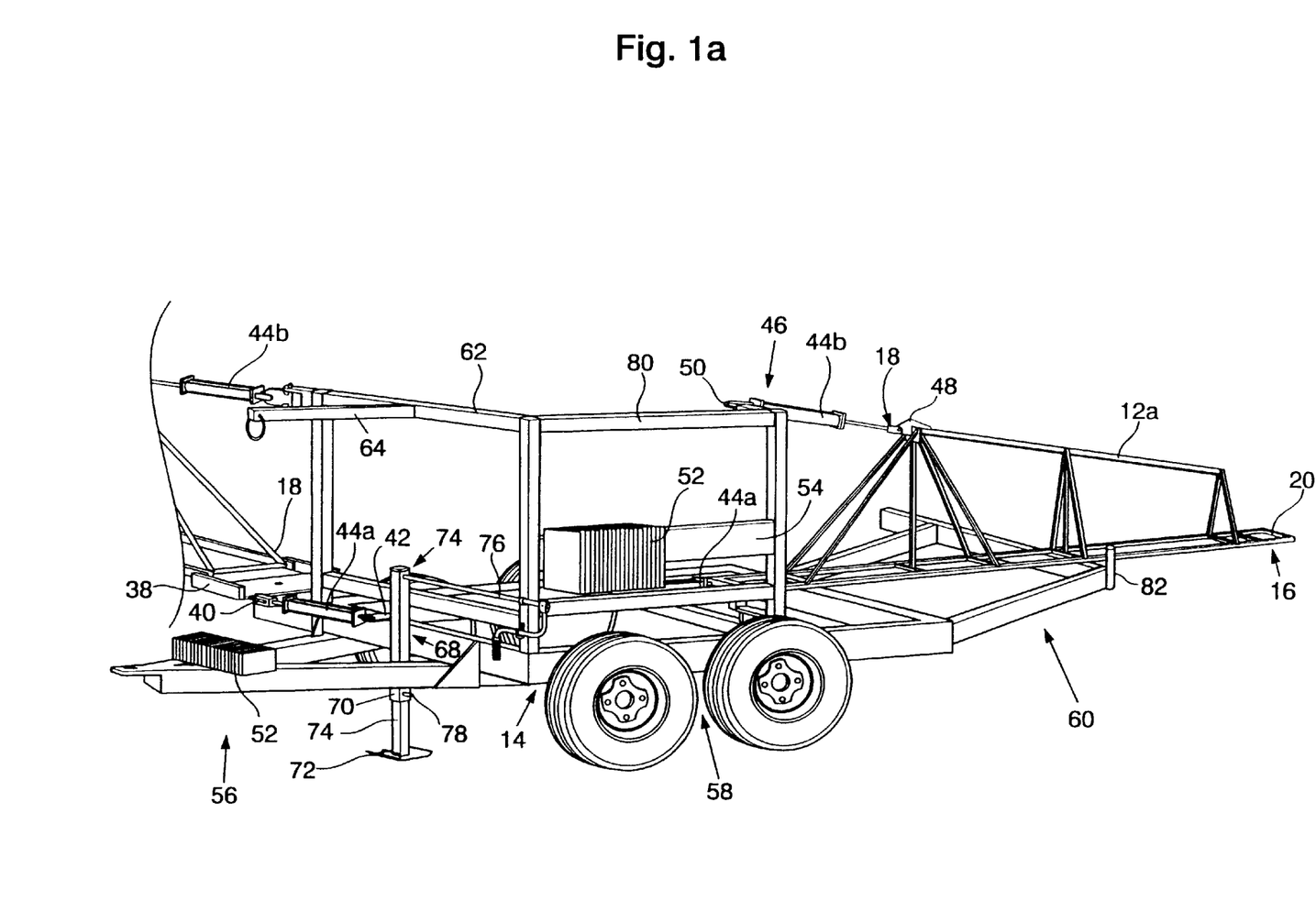
FIG. 1a is a partial perspective view of the multi-purpose dispensing apparatus of the present invention, illustrating one boom in a retracted portion and a second boom in an extended and sprayable position.
Figure 1B:
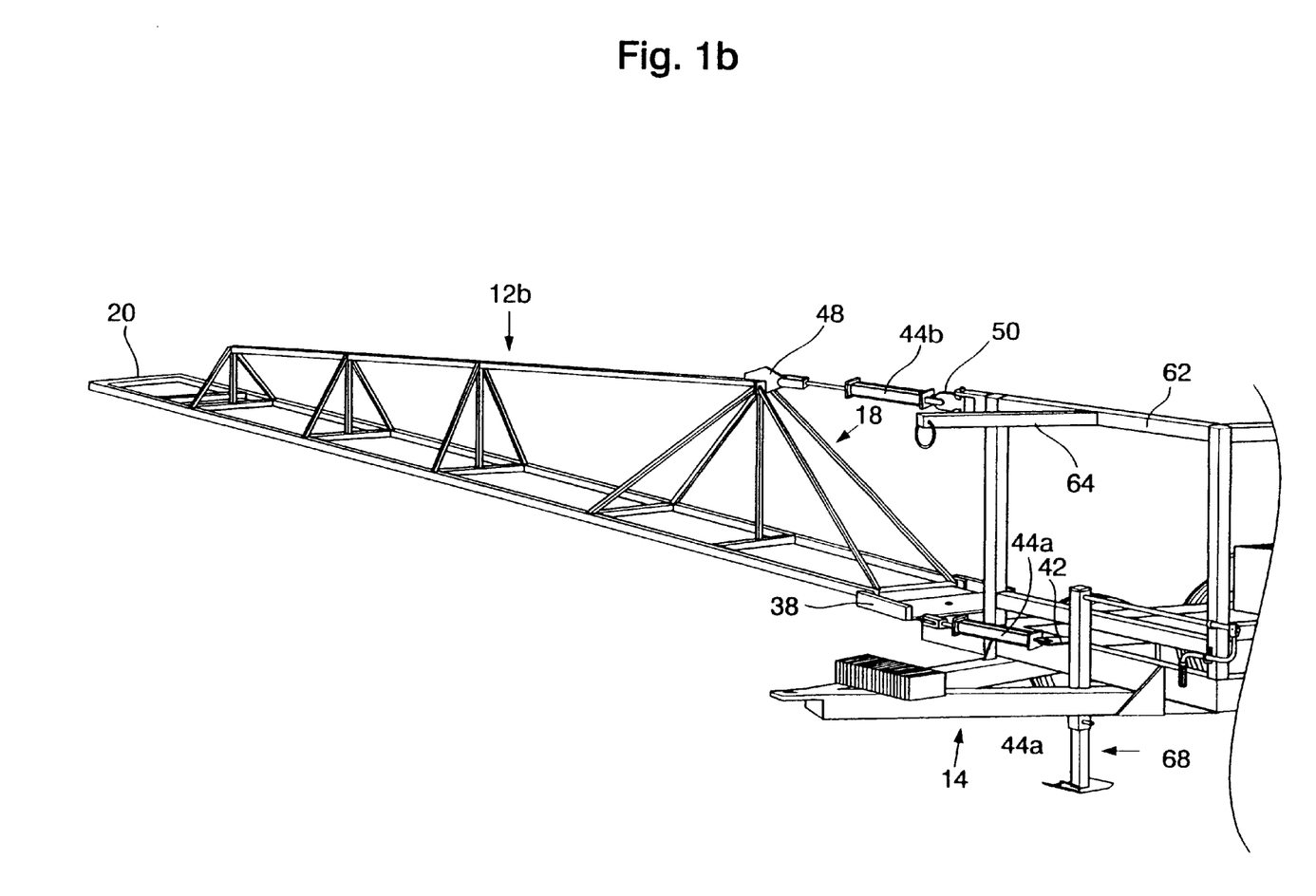
FIG. 1b is a partial perspective view of the multi-purpose dispensing apparatus of the present invention illustrating the partially shown boom of FIG. 1b in the extended and sprayable position.
Figure 2:
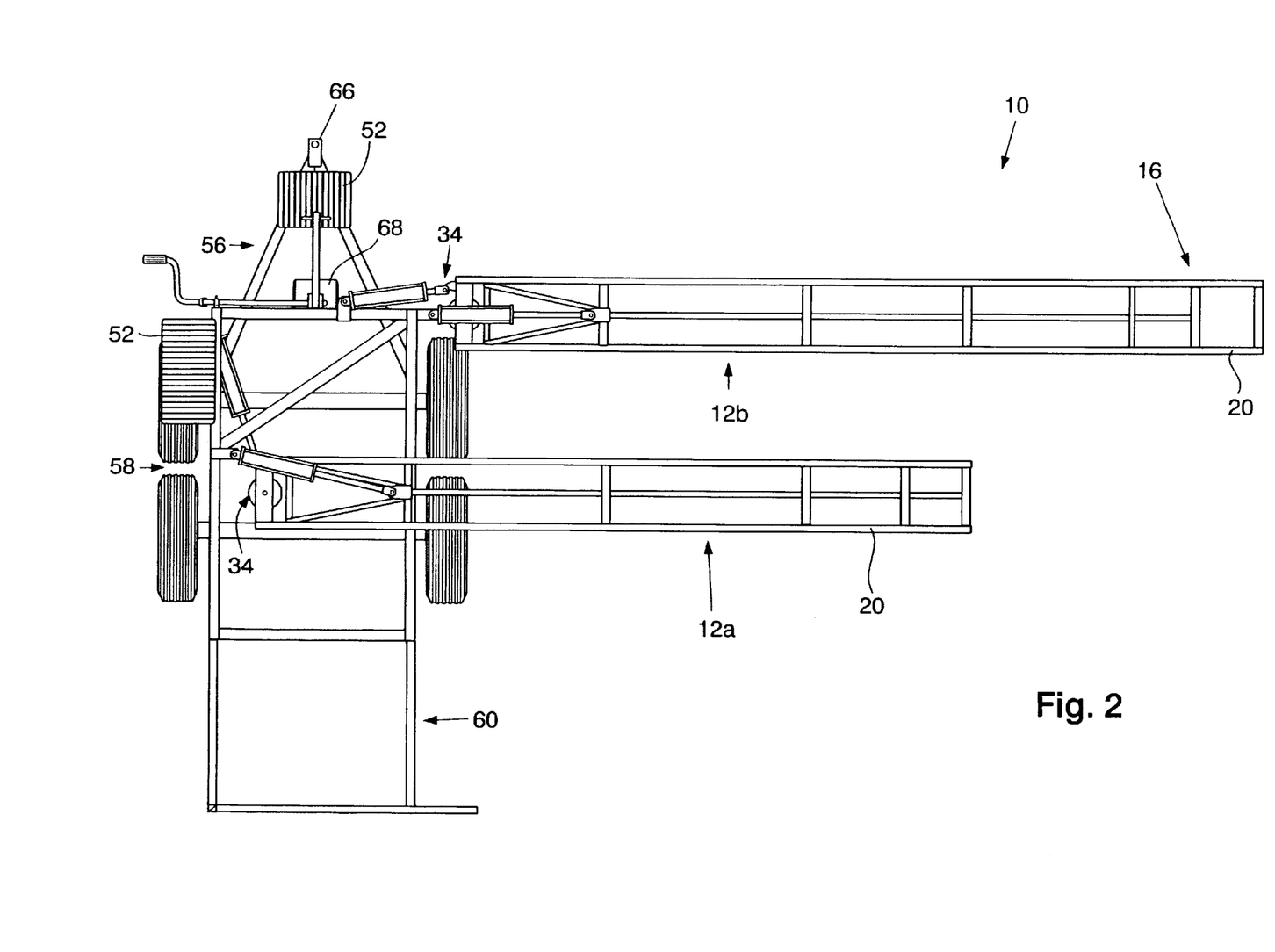
FIG. 2 is a top view of multi-purpose dispensing apparatus of the present invention in an extended and sprayable position.

With reference to the drawings, in particular to FIGS. 1a–2 thereof, the multi-purpose dispensing apparatus, generally denoted by reference numeral 10 will be described. The present invention can be used in a plurality of environments and situations, for enabling the disbursement of any desirable material. This invention has been used successfully in the nursery industry, wherein pluralities of plants were swath with a conventional gradual pesticide applicator. The dispensing apparatus proved to be successful by inherently reducing time, labor, and number of individual, as previous required, to adequately and efficiently swath crops of plants with a gradual pesticide application.

As seen in the drawings, in particular to FIGS. 1a–2 and 5, the present invention 10 comprises a pivotally mounted booms, 12a and 12b, secured to a trailer 14. The trailer maintains the booms and is adapted to be removably secured to a conventional tractor or the like. This removable attachment provides for an apparatus that is easy to transport, store and maintain.

The booms, illustrated in these figures as 12a and 12b, are pivotally secured to the trailer 14 to provide for the booms to be in a first position, as illustrated in FIGS. 1b and 2, for spraying, and a second position, illustrated in FIG. 1a, for storing. The first position is known as the sprayable position and is designed and configured to provide for the booms to be perpendicularly located with respect to the trailer. In the second position, known as the storing position, the booms are located transversely and behind the trailer.

Each boom operates independently and includes a truss configuration. The booms are varying in length so as to provide for a final product wherein the first boom can service subsequent plants while the second portion will service preceding plants.

Figure 5:
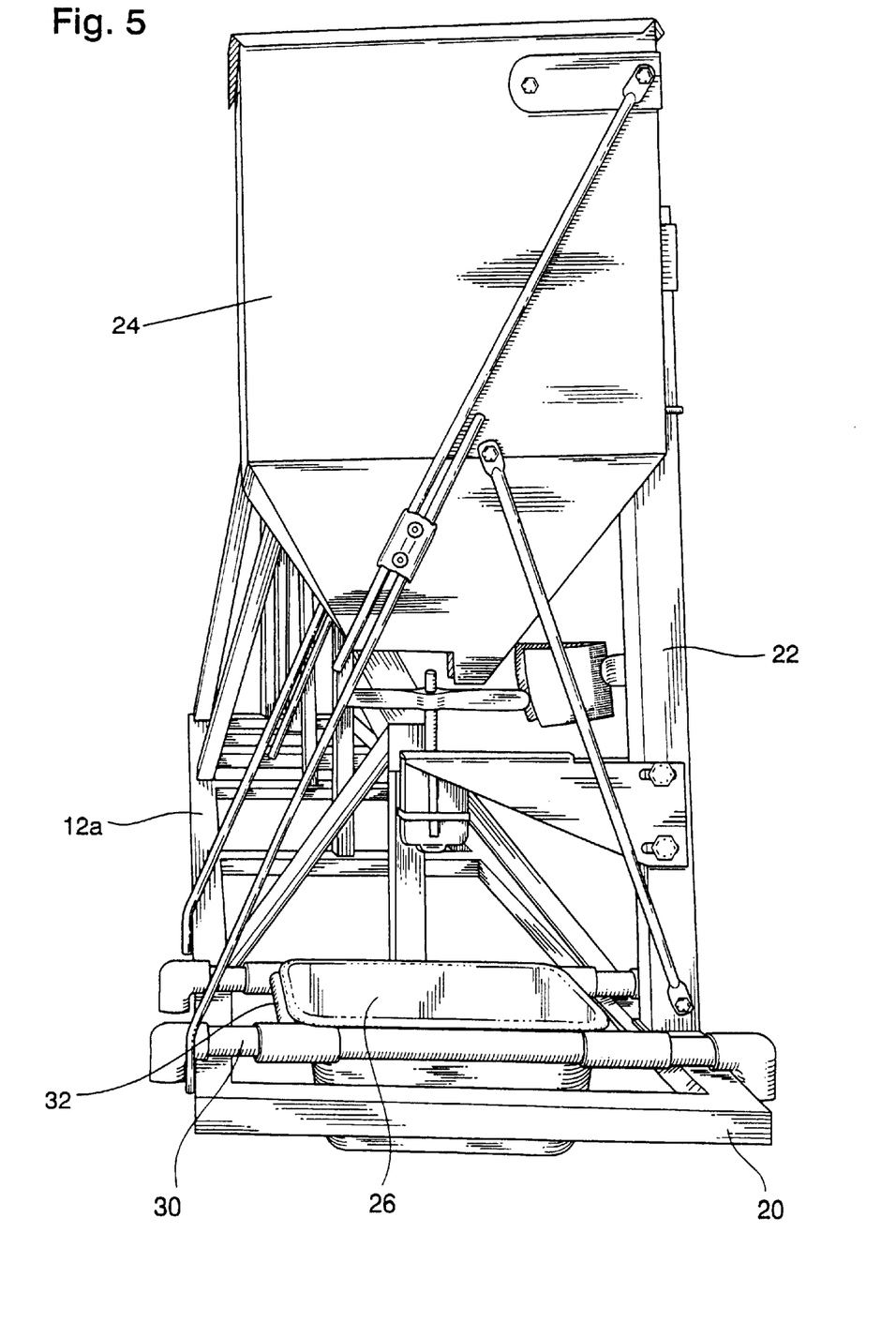
FIG. 5 is a side view of one of the booms of the present invention having a conventional hopper attached thereto.

Each boom includes a first end 16 and a second end 18. The first end 16 is the outer-most end, with respect to the trailer, and includes and extension 20. This extension extends outward from the first end 16 and is a substantially horizontal frame member. Extending upwardly from a side of this extension is a conventional attaching device 22 for attaching a conventional farm implement device, such as a conventional hopper 24, as illustrated in FIG. 5. The conventional attaching device 22 is a support frame for supporting the conventional farm implement device. This conventional farm implement device is removably secured thereto. For swathing plants a conventional hopper is preferred and it will maintain the particular substance which is to be disperse. As a safety precaution, and as further illustrated in FIG. 5, if the conventional farm implement is a dispensing apparatus, then removably secured under the farm implement is a catching tray 26. The catching tray 26 is supported and secured to the extension 20 via a holding frame member. The holding frame member holds and maintains the catching tray, which is merely a receptacle. The receptacle will catch any excess substance when transporting the unit from field to field, storage to field or field to storage. When the apparatus is being utilized for spraying and dispensing a substance, the tray and its respective frame, are removed from the extension of the boom.

The holding frame member, shown in FIG. 5, but not labeled, includes a pair of parallel inverted U-shape shafts 30, which will rest over the outer ends of the extension 20. Perpendicular bars 32, partially seen in FIG. 5, are located between the parallel shafts 30 to provide for an opening to be located therebetween. This opening will receive and maintain the tray 26. This arrangement will provide for the tray to be removably secured to the holding frame member to allow the user to use a particular tray for a particular substance. Optionally, the tray and holding frame member can be an integral structure.

It is noted that each boom is not solely limited to the use of hoppers or to the use of a singular farm implement device, but rather, other implements and other numbers of devices can be attached to each boom. The other devices which can be used include other conventional farming implement devices, such as, but not limited to, sprayers, toppers, or the like. Enabling other implements to be attached will provide an apparatus which is versatile and applicable to any environment or situation.

Figure 3:
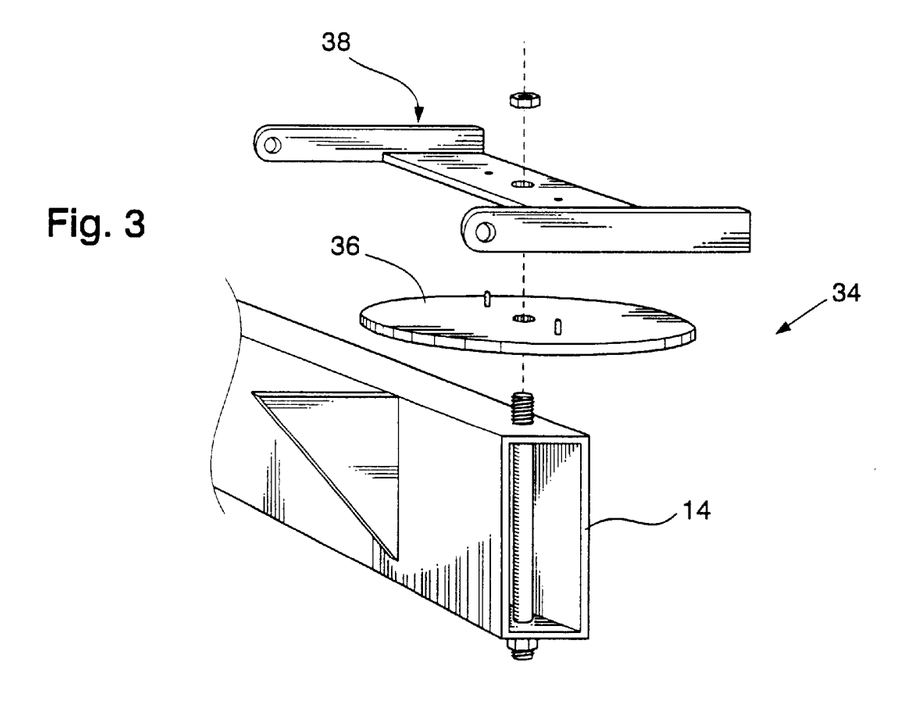
FIG. 3 is an exploded view of the pivot means used with the booms of the apparatus of the present invention.

As seen in FIGS. 1a–2, the second end 18 of each boom is secured, pivotally, to the trailer 16 via a coupling device 34. The unique structure of the coupling device 34, that is clearly illustrated and denoted in FIG. 2, allows for the booms 12a and 12b to extend perpendicularly from the trailer in a utilization or swathing position and transversely behind the trailer in a storing and transporting position. As seen in FIG. 2 and in its exploded view in FIG. 3, the coupling device 34 allows for pivotal movement of the boom, and as such, comprises, a turntable mechanism which enables the booms to extend outward or inward. The coupling device 34 includes a turntable 36 and a U-shape bracket 38. The U-shape bracket 38 is coupled to the inner end of the particular boom and is pivotally secured to the top of the turntable 36. This will provide for the turntable 38 to be sandwich between the trailer 14 and the U-shape bracket 38.

Extending outwardly from the U-shape bracket is a flange 40, labeled in FIG. 1a. Extending outward from a side of the trailer is a second flange 42. Secured to the first flange 40 of the U-shape bracket 38 and to the second flange 42 of the trailer is a conventional hydraulic cylinder 44a.

Hence, when the hydraulic cylinder 44a is in an extended position the first boom 12a is located transversely behind the trailer. Therefore, when the hydraulic cylinder 44a extends inward, it pulls the U-shape bracket 38 inward that will inherently cause the boom to extend perpendicularly from the trailer. Reversing the process will provide for the first boom to retract to its store position.

As for the second boom 12b, when the hydraulic cylinder 44a is retracted, the boom is located transversally behind the trailer. Activating the hydraulic cylinder 44 will cause it to push the U-shape bracket 38, which will inherently rotate the turntable 36 to cause the boom to pivot outward. When the cylinder 44a retracts, it pulls the U-shape bracket 38 inward, which inherently rotates the turntable in an opposite direction to cause the boom to retract to its original position. The placement of the hydraulic cylinders 44a is best illustrated in the top view of the apparatus of FIG. 2.

To protect the turntable, grease is located on its upper and lower surfaces. The grease will not only allow for a smooth transition from a retracted usable position to a traversed and storable position, and vise versa, but will also prevent damage, such as rust, to occur with any of the components.

To add to the versatility of the apparatus, each boom can include an adjusting and leveling mechanism 46, illustrated in FIGS. 1a–2. This adjusting and leveling mechanism 46 will provide for the farm implements (hoppers, dispensing device, sprayers, etc.) to be raised or lowered to any desired height. Thereby, providing for the farm implements to be tilted and pivoted to the desired height and/or angle. The adjusting and leveling mechanism 46 comprises a conventional hydraulic cylinders 38 which are secured to a first flange 48, located on the upper level of a boom and a second flange 50, located on an upper level of the trailer. Thereby, each hydraulic cylinder is sandwich between the trailer and the boom. Hence, when the cylinders are extending, they push the boom down while when retracting the cylinders pull the booms up.

To balance the assembly, counter weights 52, shown in FIGS. 1a and 2, are secured to the trailer so as to provide for a final product wherein the weights are located oppositely from the farming implements, in either the extended position or the retracted position. This will provide for the weights 52 to be secured to the front 58 of the trailer 14 and to the side via a side bar 54 of the trailer 14.

The trailer 14, seen in FIGS. 1a–2, includes a unique design and configuration so as to allow for the apparatus to work smoothly and efficiently. The trailer 14 includes a front section 56, a middle section 58, and a rear section 60. The front section 56 includes upward extending frame members 62. The upward extending frame members 62 include a holding unit 64, for holding hydraulic conduits, and a flange 50 used for maintaining an end of the leveling hydraulic cylinder of the front most boom 12a. Preferably, the front includes a ball hitch 66 to enable an easy and adequate means of attaching the trailer to a conventional tractor.

Also located on the front section 58 is a stand 68. This stand will allow for the trailer to remain in a stable and vertical position when the apparatus is not attached to a tractor or the like. The stand 68 includes a telescopic shaft having a plurality of support members 70 and a base 72 secured to the lower-most support member 70. Accordingly, when the device is stored, the stand is released to provide for the base 72 to contact the ground and support the trailer and the boom assembly. When the apparatus of the present invention is being utilized, the support members 72 are lift upward to prevent the base from contacting the ground.

A securing device 74 is used to secure the telescopic shaft in a locked position, whether maintaining the telescopic shaft in an upright position or maintaining the telescopic member in an extended position. To maintain the shafts in an upright position, so that the apparatus can be utilized, the support members are lifted upward. Each support member includes a though hole in its uppermost end. When lifted, the holes will align and a handle 76 is inserted therein. The handle maintains the members in an upward position. This handle is slidably mounted on the front of the trailer to provide for an easy to use assembly.

To use the base, the user removes the handle. This will provide for the members to extend downward. Each shaft includes a second through hole located in a lower section of its respective member. When the members are down, the second through holes are aligned and a pin 78 is inserted therein. This will lock the members in a secure position, thus allowing for successful storage.

The middle section 58 includes a second upward extending frame member 80 which is perpendicularly located with respect to the first upward extending frame member 62. This second upward extending frame member includes the second flange 50 used for maintaining an end of the leveling hydraulic cylinder of the back most boom.

Extending outward and upward from the middle of the frame member is the rear section 60 of the frame. This rear section is displaced upward from middle so as to provide for a rest for the booms when in the transverse position. A stop 82 is also provided on this rear portion. This stop will prevent the booms from traveling in an incorrect position.

Figure 4:
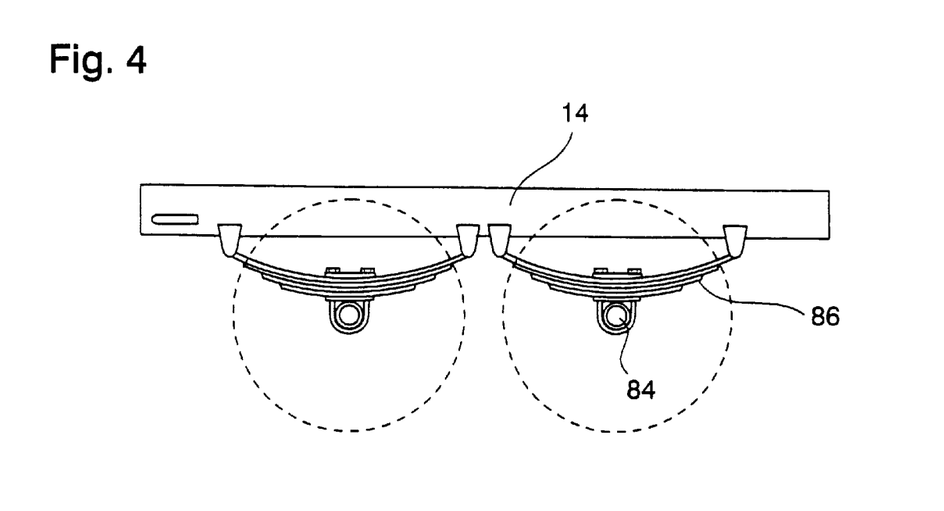
FIG. 4 is an enlarged view of an example of a suspension system used with the trailer of the multi-purpose dispensing apparatus of the present invention.

The trailer wheel assembly can be any conventional assembly. Preferably, the wheels are mounted on axles 84 which are suspended by springs 86, as illustrated in FIG. 4. This arrangement will provide for an independent wheel suspension system that provides an overall smooth ride for adequately and efficiently dispensing the particular item to be disperse via the conventional farm implement device.

Power is supplied to the farm implement device via conventional means. Thereby, a hydraulic system is used. Hydraulic and electrical conduits extend from the trailer to the cylinders, as well as to the farm implement device. The conduits can be secured to the boom to prevent damage thereto.

While the invention has been particularly shown and described with reference to an embodiment thereof, it will be understood by those skilled in the art that various changes in form and detail may be made without departing from the spirit and scope of the invention.

We claim:

1. A multi-purpose dispensing apparatus comprising:
   a trailer assembly;
   a hook-up assembly is located on said trailer to enable said trailer to attach to a conventional swathing tractor
   a first boom frame having a first end and a second end;
   a second boom frame having a first end and a second end;
   a first coupling device pivotally secures said first end of said first boom frame to said trailer assembly;
   a second coupling device pivotally secures said first end of said second boom frame to said trailer assembly;
   said first coupling device enables said first boom frame to travel longitudinally perpendicular from said trailer and retract behind said trailer and said second coupling device enables said second boom frame to travel longitudinally perpendicular from said trailer and retract behind said trailer and said first boom and said second boom will be located a same side with respect to said trailer and to be parallel to each other when said first boom and said second boom are retracted and when said first boom and said second boom are in a transverse and horizontal position; and
   said first boom frame includes a first length;
   said second boom frame includes a second length;
      said first length is longer than said second length to provide for said first boom frame to extend pass said second boom frame;
      said first boom frame will extend pass and be parallel to said second boom frame when in a longitudinally perpendicular position and when in a prependicular position;
   wherein said first boom frame will pass over subsequent plants and said second boom frame will pass preceding plants along the same side with respect to said trailer.

2. A dispensing apparatus as in claim 1 wherein a farm implement device used for swathing or spraying is secured to said second end of said first boom frame and said second boom frame.

3. A dispensing apparatus as in claim 1 wherein said first boom frame operates independently from said second boom frame.

4. A dispensing apparatus as in claim 1 wherein said second end of said first boom frame and said second end of said second boom frame each include an extension, each extension includes a support frame which extends upwardly and perpendicularly from said extension, and said support frame can removably maintain a farm implement device used for swathing or spraying.

5. A dispensing apparatus as in claim 4 wherein a tray is removably secured to each extension.

6. A dispensing apparatus as in claim 1 wherein a first height adjusting device is secured to said first boom and a second height adjusting device is secured to said second boom, said first height adjusting device and said second height adjusting device will raise and lower said first boom frame and said second boom frame, respectively.

7. A dispensing apparatus as in claim 1 wherein weights are secured to a front and a side of said trailer balance.

8. A dispensing apparatus as in claim 1 wherein said trailer includes a front section, a middle section, and a rear section, said rear section extends upwardly to provide for a natural rests for said first boom frame and said second boom frame when in a transverse position.

9. A dispensing apparatus as in claim 8 wherein said front section includes a stand for enabling said trailer to be a free standing device when not in use.

10. A dispensing apparatus as in claim 8 wherein a first upward extending member extends upwardly from said front section of said trailer and a second upward extending member extends upwardly from said middle section, and said first upward extending member is perpendicular to said second upward extending member.

11. A dispensing apparatus as in claim 8 wherein said trailer includes wheels mounted on axles which are suspended from springs.

12. A dispensing apparatus as in claim 8 wherein said rear section includes a stop located oppositely from travel path of said first boom frame and said second boom frame.

13. A dispensing apparatus as in claim 8 wherein weights are secured to a front and a side of said trailer for balance.

14. A dispensing apparatus as in claim 1 wherein said hook-up device is a ball hitch assembly.

15. A dispensing apparatus as in claim 8 wherein said hook-up device is a ball hitch assembly.

16. A dispensing apparatus as in claim 1 wherein said first coupling device and said second coupling device each include a hydraulic cylinder and a turntable, said hydraulic cylinder includes a first end and a second end, said first end of said hydraulic cylinder is secured to said turntable, said second end of said hydraulic cylinder is secured to said frame, and said turntable is secured to said first end of each boom frame.

17. A dispensing apparatus as in claim 6 wherein said first height adjusting device includes a first hydraulic cylinder secured to an upper end of said first boom and said frame, and said second height adjusting device includes a second hydraulic cylinder secured to an upper end of said second boom and said frame.

18. A dispensing apparatus as in claim 16 wherein said first height adjusting means includes a second set of hydraulic cylinders, said second set comprises a first hydraulic cylinder secured to an upper end of said first boom and said frame, and a second height hydraulic cylinder secured to an upper end of said second boom and said frame.

19. A dispensing apparatus as in claim 8 wherein said first coupling device and said second coupling device each include a hydraulic cylinder and a turntable, said hydraulic cylinder includes a first end and a second end, said first end of said hydraulic cylinder is secured to said turntable, said second end of said hydraulic cylinder is secured to said frame, and said turntable is secured to said first end of each boom frame.

* * * * *